(12) United States Patent
Visser et al.

(10) Patent No.: US 8,856,583 B1
(45) Date of Patent: Oct. 7, 2014

(54) FAILOVER OPERATION ON A REPLICATED DISTRIBUTED DATABASE SYSTEM WHILE MAINTAINING ACCESS INVARIANCE

(75) Inventors: Josephus Cornelius Willibrordus Visser, Zurich (CH); Marcin Michalski, Lachen (CH); Raymond Blum, Brooklyn, NY (US); Stefan Valentin Gheorghita, Zurich (CH); Johan Marinius Andersen, New York, NY (US)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 13/355,370

(22) Filed: Jan. 20, 2012

(51) Int. Cl.
*G06F 11/07* (2006.01)

(52) U.S. Cl.
USPC ........................................ 714/4.11; 714/6.3

(58) Field of Classification Search
CPC ............ G06F 11/2023; G06F 11/2025; G06F 11/2028; G06F 11/2033; G06F 11/2089; G06F 11/2092
USPC .................................................. 714/4.11, 6.3
See application file for complete search history.

(56) References Cited

U.S. PATENT DOCUMENTS

| | | | | |
|---|---|---|---|---|
| 6,622,259 B1 * | 9/2003 | Schmuck | .................. | 714/4.21 |
| 6,912,569 B1 * | 6/2005 | Sharma et al. | ................ | 709/223 |
| 7,640,451 B2 * | 12/2009 | Meyer et al. | .................. | 714/4.11 |
| 7,739,237 B2 * | 6/2010 | Holenstein et al. | ........... | 707/612 |
| 7,761,680 B2 * | 7/2010 | Ash et al. | ...................... | 711/165 |
| 7,979,517 B1 * | 7/2011 | Wang et al. | .................... | 709/221 |
| 8,301,593 B2 * | 10/2012 | Hoffmann et al. | ............ | 707/615 |
| 2005/0015657 A1 * | 1/2005 | Sugiura et al. | ..................... | 714/6 |
| 2006/0277378 A1 * | 12/2006 | Morishita et al. | ............. | 711/162 |
| 2007/0168692 A1 * | 7/2007 | Quintiliano | ........................ | 714/4 |
| 2007/0226277 A1 * | 9/2007 | Holenstein et al. | ........... | 707/204 |
| 2007/0294563 A1 * | 12/2007 | Bose | ................................ | 714/5 |
| 2008/0256557 A1 * | 10/2008 | Goft et al. | ....................... | 719/320 |
| 2011/0106778 A1 * | 5/2011 | Chan et al. | ..................... | 707/704 |
| 2011/0138052 A1 * | 6/2011 | Caplan et al. | ................. | 709/226 |
| 2011/0178983 A1 * | 7/2011 | Bernhard et al. | ............. | 707/610 |
| 2011/0179231 A1 * | 7/2011 | Roush | ........................... | 711/152 |
| 2011/0213994 A1 * | 9/2011 | Thereska et al. | .............. | 713/320 |
| 2012/0110118 A1 * | 5/2012 | Luna et al. | ..................... | 709/217 |
| 2012/0166390 A1 * | 6/2012 | Merriman et al. | ............ | 707/613 |
| 2012/0239687 A1 * | 9/2012 | Aronovich et al. | ........... | 707/769 |
| 2012/0246517 A1 * | 9/2012 | Bender et al. | .................... | 714/45 |
| 2013/0031341 A1 * | 1/2013 | Ganti et al. | ........................ | 713/2 |
| 2013/0097456 A1 * | 4/2013 | Drucker et al. | .............. | 714/4.11 |

* cited by examiner

*Primary Examiner* — Chae Ko
(74) *Attorney, Agent, or Firm* — Honigman Miller Schwartz and Cohn LLP (57) ABSTRACT

Systems and methods are disclosed herein for performing a failover operation between a first distributed database cluster and a second distributed database cluster. In one aspect, the method includes blocking a plurality of software processes from making any new access requests to the first distributed database cluster and completing a current access request to the first distributed database cluster that was initiated by one of the plurality of software processes before the failover operation was initiated, waiting for data to replicate from the first distributed database cluster to the second distributed database cluster, wherein replicating includes any changes to the data from the current access request, and allowing the plurality of software processes to make the new access requests to the second distributed database cluster once the replicating has completed.

28 Claims, 5 Drawing Sheets

FAILOVER OPERATION ON A REPLICATED DISTRIBUTED DATABASE SYSTEM WHILE MAINTAINING ACCESS INVARIANCE

FIELD OF THE DISCLOSURE

The present disclosure relates generally to distributed database clusters and in particular to conducting failover operations on replicated distributed database systems.

BACKGROUND

A distributed database, or a distributed data store, is a database in which information is stored on multiple storage devices with multiple computer processor units. A distributed database cluster is the system of storage devices on which a distributed database is stored. The distributed database cluster may be multiple computers in the same physical location, or may be multiple computers that are physically dispersed but connected via a communication network. Distributed database clusters store large amounts of data that are accessible by a large number of computers. For example, large corporations or other organizations that create, maintain, and allow access to a large amount of information internally or externally may use distributed database clusters to store the information.

Distributed databases systems are subject to service disruptions if all or a part of the distributed database cluster is upgraded, replaced, or otherwise subject to maintenance. Several methods have been developed to maintain service in the event of a planned disruption in service of a distributed database cluster. One such method involves providing multiple distributed databases systems that maintain the same information, otherwise known as a replicated distributed database system. Before one distributed database cluster is shut down for maintenance, access requests to that system are directed to another distributed database cluster. The process of switching from a one distributed database cluster to a replacement distributed database cluster is known as a "failover operation."

Information is dispersed among replicated distributed database systems in at least two ways. In one method, one distributed database cluster is designated the master distributed database cluster through which all access requests are handled. When changes are made to the master distributed database, the changes are replicated to the backup, or slave, database systems. This configuration is known as a primary-backup or master-slave scheme. In another method, access requests can be made to any distributed database cluster. Changes to any one distributed database cluster are replicated to the other distributed database clusters. This configuration is known as a multi-primary or multi-master scheme. In a replicated distributed database system, it is important that all database systems maintain consistent information when accessed. More specifically, a read request for a datum in a replicated distributed database system should be directed to a distributed database cluster in which all previous write requests to that datum have been applied. This is known as access invariance. The access invariance of a replicated distributed database system should be maintained during a failover operation.

While replication of data among the distributed database clusters is an ongoing process, during a failover operation it is important that the current data in the original distributed database cluster are completely transferred to a new distributed database cluster that will remain operational. If a failover operation occurs and the new distributed database cluster does not contain the exact same information as the original distributed database cluster, information will be lost. Future access requests to the new distributed database cluster may return outdated or erroneous information. In addition, when a failover operation occurs all client software processes should stop accessing the original distributed database cluster. This is usually accomplished by forcing the software processes to abort and then restarting the processes after the failover operation is complete. Due to these constraints, failover operations have generally taken a substantial amount of time to complete, especially when the replicated distributed database system is large.

SUMMARY

Systems and methods are disclosed herein to complete a failover operation on a replicated distributed database system and ensure access invariance of the replicated distributed database system. In one aspect, a method is disclosed for performing a failover operation between a first distributed database cluster and a second distributed database cluster. The method includes blocking a plurality of software processes from making any new access requests to the first distributed database cluster and completing a current access request to the first distributed database cluster that was initiated by one of the plurality of software processes before the failover operation was initiated. The method further includes waiting for data to replicate from the first distributed database cluster to the second distributed database cluster, wherein replicating includes any changes to the data from the current access request. The method further includes allowing the plurality of software processes to make the new access requests to the second distributed database cluster once the replicating has completed.

In another aspect, a non-transitory computer readable medium storing computer executable instructions, which, when executed by a processor, cause the processor to carry out a method for controlling a plurality of software processes through a failover operation between a first distributed database cluster and a second distributed database cluster, is disclosed. The instructions include instructions to block a plurality of software processes from making any new access requests to the first distributed database cluster and instruction to complete a current access request to the first distributed database cluster that was initiated by one of the plurality of software processes before the failover operation was initiated. The instructions further include instructions to wait for data to replicate from the first distributed database cluster to the second distributed database cluster, wherein replicating includes any changes to the data from the current access request. The instructions further include instructions to allow the plurality of software processes to make the new access requests to the second distributed database cluster once the replicating has completed.

In another aspect, a replicated distributed database system is disclosed. The system includes a plurality of distributed database clusters and a plurality of computing devices running a plurality of software processes. Each software process in the plurality of software processes has a database abstraction layer that is configured to block any new access requests to a first distributed database cluster within the plurality of distributed database clusters when a failover operation occurs, complete a current access request to the first distributed database that was initiated by the software process before the failover operation occurs, and make the new access requests to a second distributed database cluster within the plurality of distributed database clusters after the failover operation is complete. The system further includes a plurality of lock servers configured to store a failover state file, execute an election scheme to select a leader software process from the plurality of software processes, and monitor the replication of data from the first distributed database cluster to the second distributed database cluster.

BRIEF DESCRIPTION OF THE DRAWINGS

The methods and systems may be better understood from the following illustrative description with reference to the following drawings in which.

DETAILED DESCRIPTION

To provide an overall understanding of the systems and methods disclosed herein, certain illustrative implementations will now be described, including systems and methods for performing a failover operation in a replicated distributed database system. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
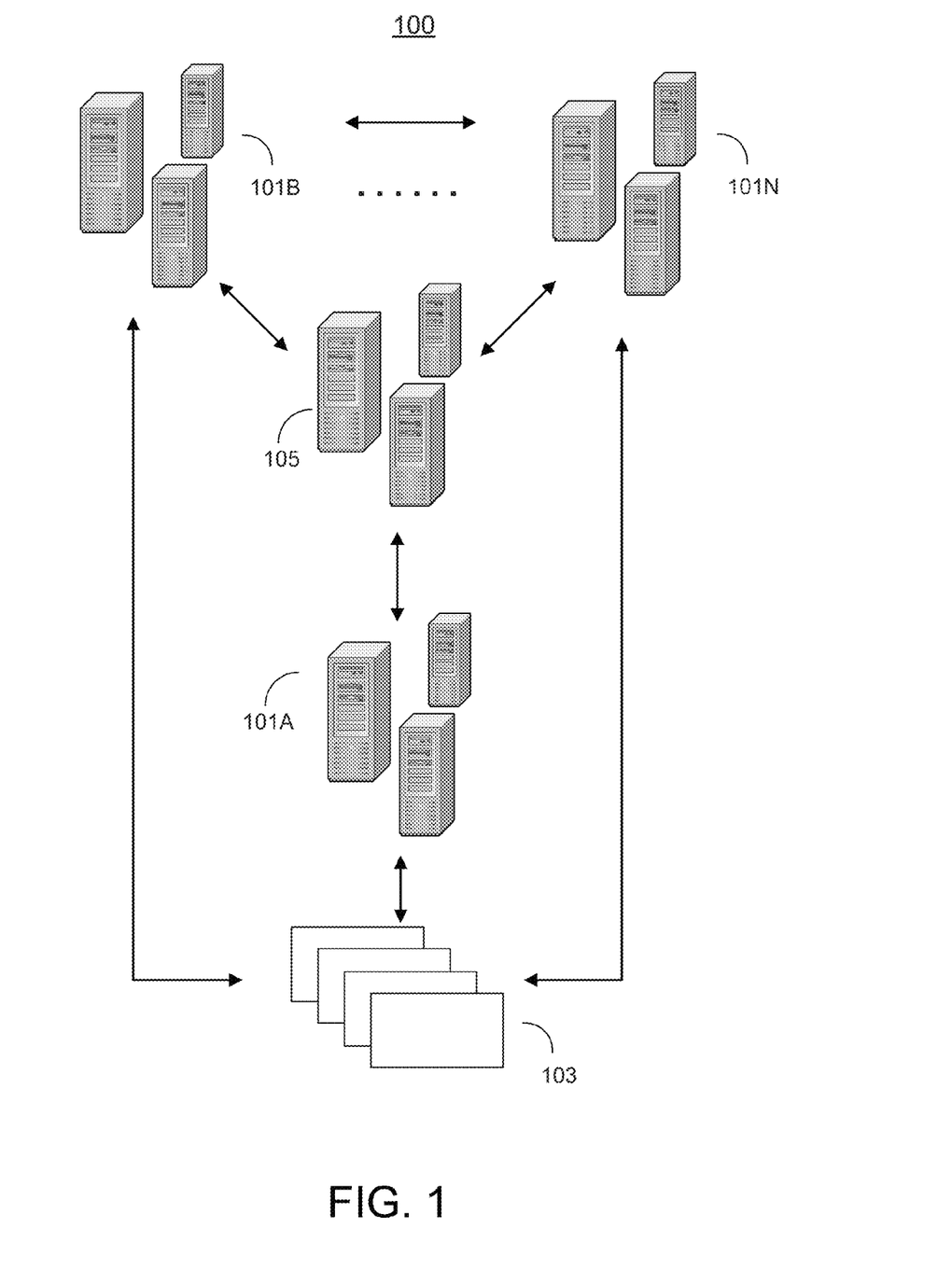
FIG. 1 is a replicated distributed database system in accordance with an implementation described herein.

First, a general replicated distributed database system will be discussed. FIG. 1 depicts an implementation of a replicated distributed database system 100. Distributed database clusters 101A through 101N are distributed database clusters that interact with a plurality of software processes 103. Each distributed database cluster is composed of a number of storage devices that in combination store the entirety of the database. There can be any number of distributed database clusters in a replicated distributed database system. Software processes 103 may be run on a variety of computing devices, including desktop computers, laptops, wireless electronic devices, and any other electronic device that can make access requests to the distributed database clusters. Software processes 103 can make access requests to any distributed database cluster 101A through 101N over an electronic network connection, for example through the Internet. Access requests may include requests to read data from the distributed database cluster or write data to the distributed database cluster.

In some implementations, replicated distributed database system 100 is configured in a multi-master scheme. Thus any changes made to one distributed database cluster are replicated to the other distributed database clusters. A plurality of lock servers 105 monitors the replication of data between distributed database clusters, as illustrated in FIG. 1. The plurality of lock servers may be implemented in a master-slave scheme or a multi-master scheme. The plurality of lock servers communicate with all the distributed database clusters in replicated distributed database system 100, for example through a computer network connection.

Each software process 103 that accesses the replicated distributed database system contains a database abstraction layer to aid in the event a failover operation occurs in one of the distributed database clusters. This database abstraction layer is a software interface between the software process and the replicated distributed database system. The database abstraction layer forwards access requests from the software process to a distributed database cluster during normal operation, but acts in the event a failover operation is initiated during an access request to the distributed database cluster that will undergo maintenance. The database abstraction layer may be implemented in a number of scripting languages, such as PHP. In some implementations, the database abstraction layer includes an abstract base layer and several implementation classes so that the database abstraction layer can operate on a variety of software and hardware. The database abstraction layer saves and holds any access requests made by the software process during a failover operation until the failover operation either completes or fails. The database abstraction layer can read or write to a failover state file stored on lock servers 105, as will be described in relation to FIG. 3. In some implementations, the database abstraction layer can output one or more variables describing the participation of the software process in the failover operation.

Figure 2:
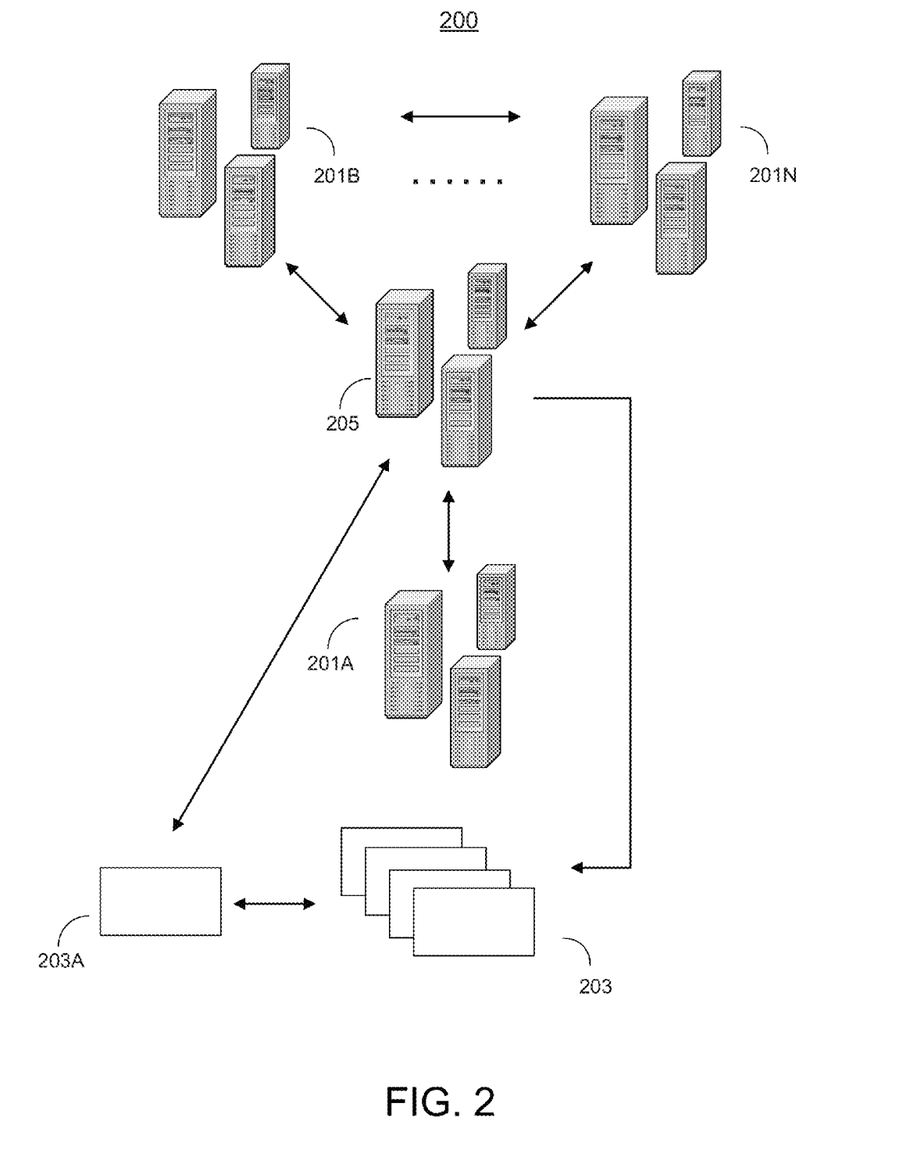
FIG. 2 is a replicated distributed database system during a failover operation in accordance with an implementation described herein.

When one distributed database cluster in a replicated distributed database system is scheduled to undergo a planned outage, then a failover operation is initiated to allow another distributed database cluster to operate in place of the original distributed database cluster. FIG. 2 depicts an example implementation of a replicated distributed database system 200 during a failover operation. In this example, a plurality of software processes 203 are making access requests to distributed database cluster 201A when a failover operation is initiated. The failover operation is initiated because of an impending scheduled maintenance on the distributed database cluster. When a failover operation is initiated, a leader software process 203A from among the plurality of software processes 203 takes action. The leader software process is chosen through an election scheme from among all software processes 203 at the time the software processes start executing. Each software process has a database abstraction layer that aids in the failover operation process. The database abstraction layer, as described above, is a software interface between the software process and the replicated distributed database system. The leader software process 203A is responsible for leading the rest of the software processes 203 through the failover operation. In some implementations, if leader software process 203A becomes unavailable during the failover operation, another leader software process is chosen from among the software processes 203 by running the election scheme again.

Figure 3:
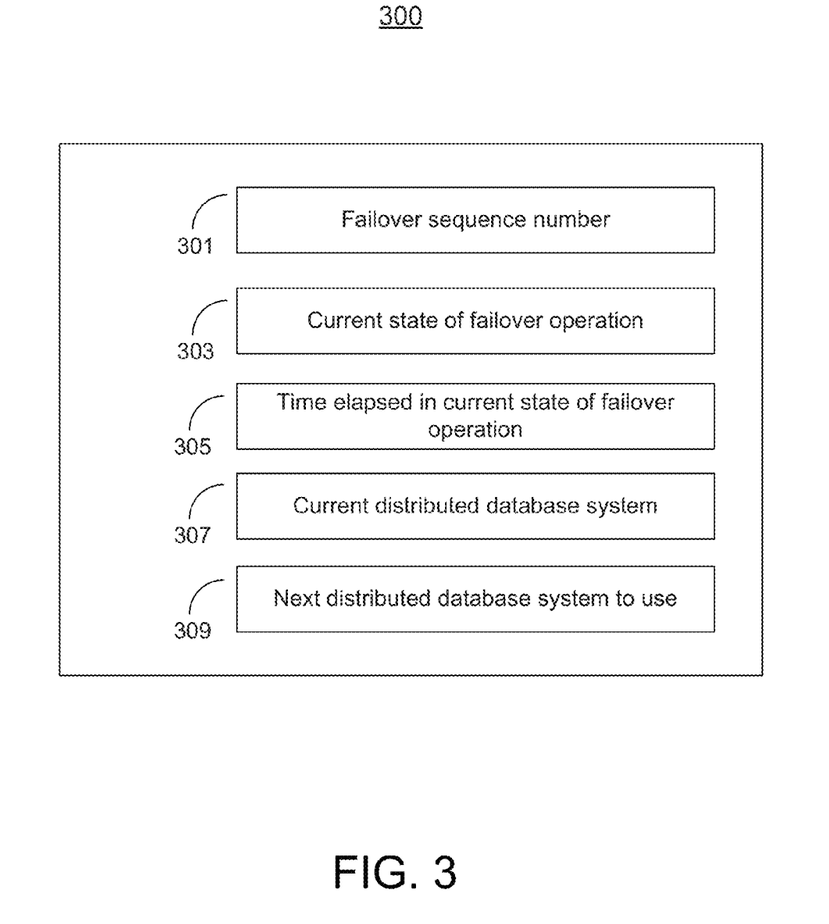
FIG. 3 is a depiction of a failover state file in accordance with an implementation described herein.

In some implementations, a plurality of lock servers 205 each stores a failover state file within its memory. A visual representation of a failover state file 300 is shown in FIG. 3. Failover state file 300 keeps track of various different parameters of the failover operation and is used by the plurality software processes 203 and leader software process 203A to track the progress of the failover operation. The leader software process 203A can write to the failover state file whereas the other software processes should only read the failover state file. The leader software process 203A can write to the failover state file stored on any lock server. The updated failover state file is then replicated to all the other lock servers. The software processes participating in the failover operation will read the current failover state file from any lock server in the plurality of lock servers.

Failover state file 300 contains several variables that can be used to track attributes of the failover operation. For example, one variable is failover sequence number 301 that uniquely identifies the failover operation that is occurring. If more than one failover operation is occurring at the same time or one has recently completed, the failover sequence number allows software processes 203 to identify whether they are participating in the correct failover operation. In some implementations, failover sequence number 301 may be the time in seconds since epoch at which the failover operation began.

In some implementations, another variable in failover state file 300 is the current state of the failover operation, depicted as current state variable 303. A failover operation occurs in a progression of discrete steps, which are described in further detail in relation to FIG. 4. The current state variable 303 indicates which step the failover operation is currently performing. Another variable in failover state file 300 is the time elapsed since the start of the current state of the failover operation, illustrated as the time elapsed variable 305. This variable is useful in determining whether or not certain time-out actions should be taken if the failover operation is stalled in a particular state. Time-outs are described further in relation to FIG. 4.

In some implementations, additional variables in failover state file 300 include the current distributed database cluster that will undergo scheduled maintenance and the next distributed database cluster that will replace the current distributed database cluster. The current distributed database cluster variable 307 denotes the identity of the distributed database cluster that will undergo maintenance. The next distributed database cluster variable 309 denotes which distributed database cluster the plurality of software processes 203 will access once the failover operation is complete. There may be many distributed database clusters in the replicated distributed database system so it is important for the software processes to correctly identify the distributed database clusters that are participating in the failover operation.

Leader software process 203A in FIG. 2 is responsible for updating the failover state file. For example, the leader software process may update current state variable 303 and elapsed time variable 305 as the failover operation progresses through its various steps. The rest of software processes 203 participating in the failover operation can read the failover state file to determine the status of the failover operation, but should not edit the file. In this manner, the leader software process 203A uses the failover state file to prompt the other software processes 203 through the failover operation. If a software process is not on the same step of the failover operation or is not participating in the same failover operation as indicated by the failover state file, the software process aborts. This may happen, for example, if a software process freezes for a period of time during which the failover operation has progressed to a different step.

In some implementations, all software processes 203 participating in the failover operation generate failover variables during the failover operation. These variables are monitored to ensure that each software process is participating correctly in the failover operation. A monitoring system may monitor the failover variables. The failover variables may include the current state of the failover operation that the software process is performing, the failover sequence number of the failover operation the software process is participating in, whether the software process is the leader software process, what distributed database cluster the software process is currently using, and the failover operation start time and end time. If there are discrepancies between the information in the failover state file and the failover variables of a software process participating in the failover operation, then additional actions may be taken. These actions may include notifying a system administrator or aborting the software process that is participating in the failover operation.

A detailed method of performing a failover operation on a replicated distributed database system will now be described. When a failover operation is initiated, all software processes that are accessing the original distributed database cluster are prevented from making any new access requests to that system. All access requests that were started by the software processes to the original distributed database cluster before the failover operation is initiated are allowed to complete, after which the software processes wait for all data to be replicated to a new distributed database cluster. After replication has completed, the software processes that were accessing the original distributed database cluster are directed to use the new distributed database cluster. In this manner, a failover operation can be performed while maintaining the access invariance of the replicated distributed database system. An illustration of this method of performing a failover operation is found in FIG. 4. Method 400 may be performed on replicated distributed database system 200 in FIG. 2, but may also be performed on other configurations of replicated distributed database systems. The replicated distributed database system includes a plurality of distributed database clusters, a plurality of computing devices running software processes that can make access requests to one or more distributed database clusters, and one or more lock servers.

Method 400 for performing a failover operation on a replicated distributed database system first includes waiting for a failover operation to initiate. In the normal course of operation, a number of software processes running on a number of computing devices make access requests to a distributed database cluster in the replicated distributed database system. These access requests may include requests to read data or to write data to the distributed database cluster. The software processes each have a database abstraction layer, but the layer is not active when no failover operation is occurring. A plurality of lock servers in the replicated distributed database system maintains a failover state file, such as illustrated in FIG. 3. During normal operation, the current state variable 303 in failover state file 300 will indicate that no failover operation is occurring. In some implementations, the failover state file 300 may contain information from a previously completed failover operation which indicates that the previous failover operation is complete and the current distributed database cluster variable 307 indicates the current distributed database cluster that should be used.

If a distributed database cluster within the replicated distributed database system will undergo a scheduled maintenance, then a failover operation should be scheduled to occur before maintenance of the system begins. At step 401 in FIG. 4, an operator, such as a system administrator, initiates a failover operation using a software tool. The operator determines a new distributed database cluster that can take over for the original distributed database cluster. The operator can also edit the failover state file to indicate the start of the failover operation. A leader software process from among a plurality of software processes initiates action when a failover operation begins. The plurality of software processes collectively uses an election scheme to select the leader software process. The election scheme occurs before the failover operation begins, for example when the plurality of software processes begins execution. The software processes may have flags that indicate if the software process is a suitable candidate to be the leader software process. If the leader software process becomes unavailable during the failover operation, the leader software process sends the other software processes an error message. The other software processes elect another leader software process to replace the failed leader software process. The plurality of lock servers can serve as an arbiter of the election process. The leader software process is responsible for updating the failover state file stored on plurality of lock servers. The leader software process uses its database abstraction layer to edit the failover state file.

During the failover operation, the leader software process will update the failover state file. For example, the leader software process can update the current state of the failover operation, or how long the failover operation has been in the current step. In some implementations, the current state variable 303 of FIG. 3 may correspond to one or more steps in method 400. For example, current state variable 303 may indicate that no failover operation is occurring, or may indicate that the failover operation is waiting for current access requests to the original distributed database cluster to complete (step 403/405 in FIG. 4), or may indicate that software processes with outstanding access requests are being aborted (step 409 in FIG. 4), or may indicate that data are being replicated to the new distributed database cluster (step 411 in FIG. 4). The plurality of lock servers indicates to the plurality of software processes if the failover state file has been edited so that the software processes can then read the failover state file.

Figure 4:
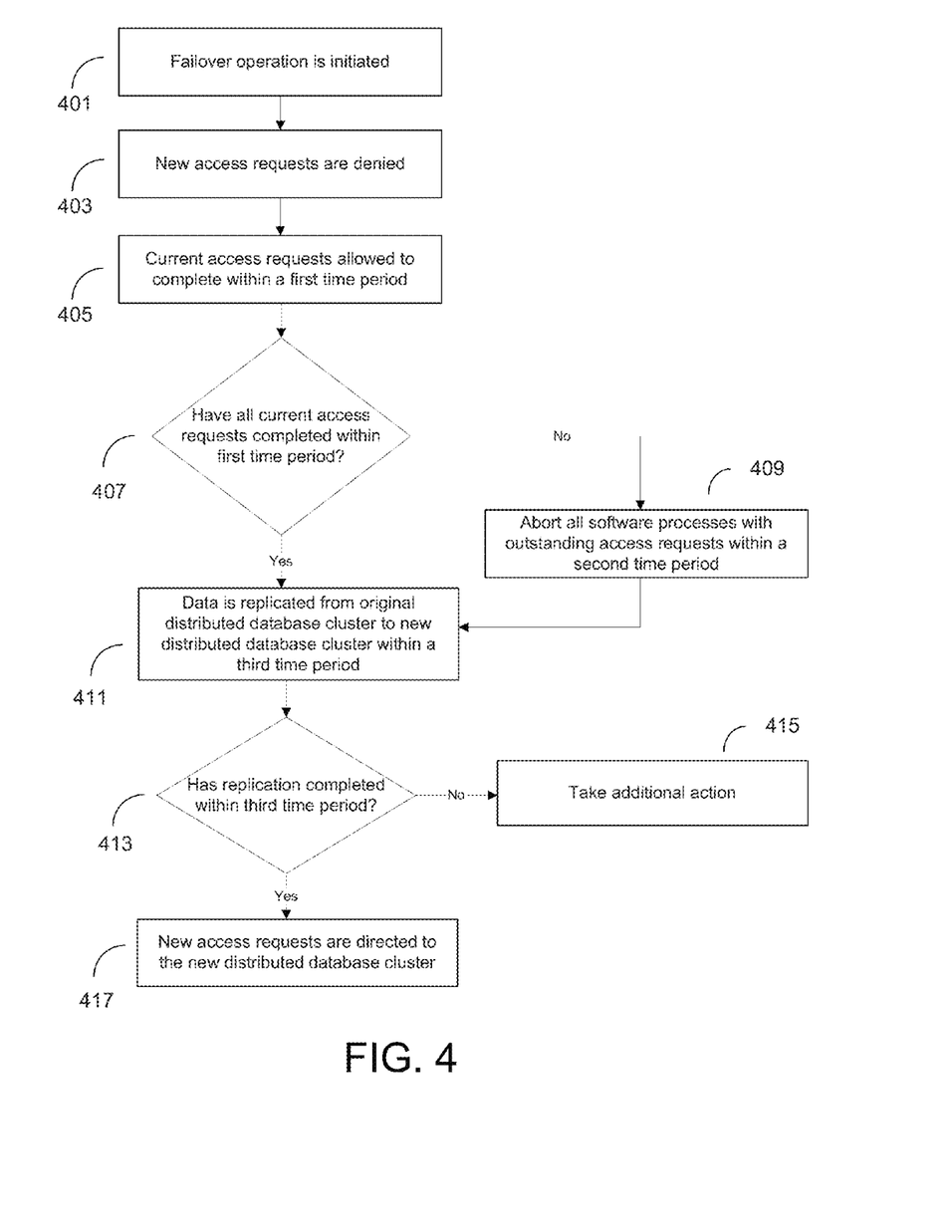
FIG. 4 is a flow chart showing a method of performing a failover operation in accordance with an implementation described herein.

After a failover operation is initiated, the next step is to block all the software processes from making access requests to the original distributed database cluster after the failover operation initiated, as represented by step 403 in FIG. 4. The plurality of lock servers indicate to the plurality of software processes if the failover state file has been edited so that the software processes can then read the failover state file. If the failover state file indicates that a failover operation has begun and new access requests should be held, the database abstraction layer intercepts all access requests made by the software process after the failover operation has begun and prevents the access requests from continuing on to the original distributed database cluster. If the failover operation is successful, the access requests that were on hold can proceed to the new distributed database cluster. In some implementations, if certain software processes that access the replicated distributed database system do not use their database abstraction layer to handle the failover operation, the database abstraction layers of those software processes causes them to abort once the failover operation is initiated. If new software processes are initiated during a failover operation, the database abstraction layer for those software processes will block all access requests to the replicated distributed database system until the failover operation is complete.

Software processes that started an access request to the original distributed database cluster before the failover operation began but had not completed it yet are allowed to finish the access request. This is illustrated in step 405 in FIG. 4. In some implementations, step 403 and 405 are concurrent steps in the failover operation and the current state variable in the failover state file counts both steps 403 and 405 as one step in the failover operation. A first time-out period may be established for step 405. The first time-out period measures how long step 405 should take before the system moves to the next step in the failover operation. During the first time-out period, the database abstraction layer for each software process determines if there are any outstanding access requests and allows them to complete, if possible. The time elapsed variable in the failover state file may be compared to the first time-out period to determine if the maximum time allowable in step 405 has been reached.

Once the first time-out period expires, the leader software process updates the failover state file to indicate that all the outstanding access requests that have not completed should be aborted, illustrated as step 407 in FIG. 4. If all access requests have completed, the method proceeds to step 411, which is described below. If not all access requests can complete by the end of the first time-out period, then the software processes that still have outstanding access requests are forced to abort by their database abstraction layers, illustrated as step 409. This step prevents certain software processes from stalling the failover operation for too long. For example, the first time-out period for step 405 may be 60 seconds and if any software processes cannot complete the access requests to the original distributed database cluster by the end of 60 seconds, those software processes are aborted. In some implementations, the leader software process changes the current state variable in the failover state file between steps 407 and 409 to indicate to the software processes that any software processes with uncompleted access requests should abort. A second time-out period may be set for step 409. The second time-out period ensures that method 400 proceeds in a timely manner. The second time-out period for step 409 should be long enough so that all software processes that have outstanding access requests can be successfully aborted. The time elapsed variable in the failover state file may be compared to the second time-out period to determine if the maximum time allowable in step 409 has been reached. The first time period and second time period should not overlap.

After all software processes that have outstanding access requests are aborted, there should not be any more changes to the data in the original distributed database cluster because all current access requests have either completed or been aborted and no new access requests can be made. The software processes then wait for data in the original distributed database cluster to be completely replicated to the new distributed database cluster, illustrated as step 411 in FIG. 4. The plurality of lock servers monitor the replication of data from the original distributed database cluster to the new distributed database cluster. When waiting step 411 begins, the leader software process changes the current state variable in the failover state file to indicate that data are being replicated. A third time-out period may be set for step 411. The leader software process determines if all the data in the original distributed database cluster have been replicated to the new distributed database cluster within the third time period, illustrated as step 413. If replication has not fully completed, the leader software process can initiate additional actions, illustrated as step 415. These actions may include trying to restart the failover operation, stopping the failover operation and declaring the failover operation unsuccessful, or some other action. If a failover operation is declared unsuccessful, one or more steps may be taken to remedy the situation, including alerting a system administrator of the problem. The time elapsed variable in the failover state file may be compared to the third time-out period to determine if the maximum time allowable in step 411 has been reached.

If all the data have been replicated from the original distributed database cluster to the new distributed database cluster, the new distributed database cluster is ready to receive access requests, illustrated as step 417 in FIG. 4. The leader software process changes the current state variable in the failover state file to indicate that the failover operation is complete and changes the current distributed database cluster variable to point to the new distributed database cluster. When the software processes participating in the failover operation read the failover state file, they will detect the failover operation has completed. Each database abstraction layer on the software processes will release any held access requests and direct the requests to the new distributed database cluster. Thus method 400 illustrates a way to perform a failover operation in a replicated distributed database system.

Figure 5:
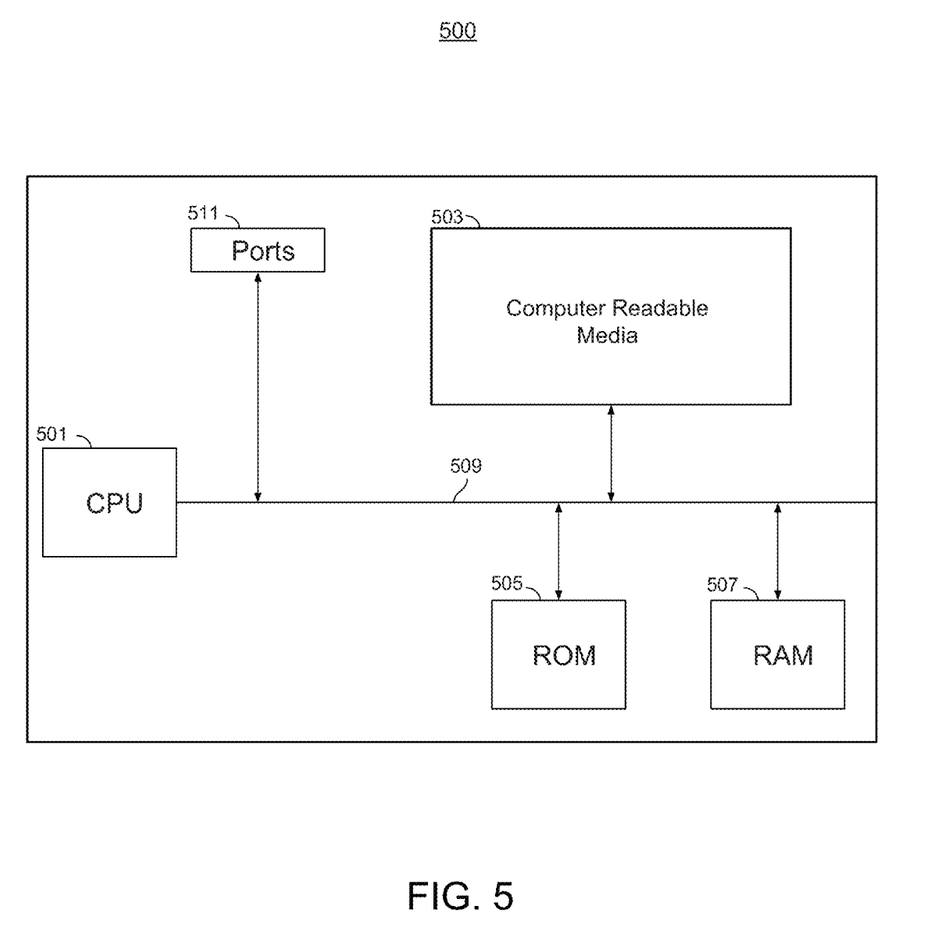
FIG. 5 is a computing device in accordance with an implementation described herein.

Software processes that interact with the replicated distributed database system are executed on a computing device. FIG. 5 shows an example computing device 500 that can execute software processes. Computing device 500 may be a desktop computer, laptop, wireless electronic device, or any other electronic device that can make access requests to the distributed database clusters. Computing device 500 includes a central processing unit (CPU) 501, computer readable media 503, read-only memory (ROM) 505, random access memory (RAM) 505, a bus 509 and ports 511. The bus 509 allows communication of information between the various components of computing device 500. Ports 511 allow communication of information between computing device 500 and external sources, such as the replicated distributed database system. Computer readable media 503 stores software application code that for executing software processes. These software processes access the replicated distributed database system. Each software process also has a database abstraction layer code stored in computer readable media 503 that includes instructions for governing the software process' interaction with the replicated distributed database system during a failover operation. Computing device 500 may have additional components not shown in FIG. 5.

Computer-readable media suitable for storing software application code and database abstraction layer code include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

It will be apparent to one of ordinary skill in the art that the systems and methods described above may be implemented in many different forms of software, firmware, and hardware in the implementations illustrated in the drawings. The actual software code or specialized control hardware used to implement aspects consistent with the systems and method described herein is not limiting. Thus, the operation and behavior of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method of performing a failover operation between a first distributed database cluster and a second distributed database cluster, the method comprising:
    blocking a plurality of software processes from making any new access requests to the first distributed database cluster;
    completing a current access request to the first distributed database cluster that was initiated by one of the plurality of software processes before the failover operation was initiated;
    waiting for data to replicate from the first distributed database cluster to the second distributed database cluster, wherein replicating includes any changes to the data from the current access request; and
    allowing the plurality of software processes to make the new access requests to the second distributed database cluster once the replicating has completed;
    wherein the software processes each have a database abstraction layer that performs the blocking of the plurality of software processes from making any new access requests to the first distributed database cluster, the completing of a current access request to the first distributed database cluster, and the allowing of the plurality of software processes to make the new access requests to the second distributed database cluster.

2. The method of claim 1, wherein the new access requests and the current access request comprise requests to write data to the first distributed database cluster.

3. The method of claim 1, wherein blocking the plurality of software processes from making new access requests to the first distributed database cluster occurs concurrently with the completing the current access request to the first distributed database cluster.

4. The method of claim 1, wherein any software processes that do not use their database abstraction layer are aborted when the failover operation is initiated.

5. The method of claim 1, wherein the completing is subject to a first time period and the method further comprises aborting the current access request if it does not complete within the first time period.

6. The method of claim 1, wherein the waiting is subject to a third time period and if the replicating does not complete within the third time period, an additional action is taken.

7. The method of claim 6, wherein the additional action comprises notifying a system administrator that the failover operation has not completed.

8. A method of performing a failover operation between a first distributed database cluster and a second distributed database cluster, the method comprising:
    blocking a plurality of software processes from making any new access requests to the first distributed database cluster;
    completing a current access request to the first distributed database cluster that was initiated by one of the plurality of software processes before the failover operation was initiated, the completing subject to a first time period;
    aborting the current access request if it does not complete within the first time period;
    waiting for data to replicate from the first distributed database cluster to the second distributed database cluster, wherein replicating includes any changes to the data from the current access request; and
    allowing the plurality of software processes to make the new access requests to the second distributed database cluster once the replicating has completed;
    wherein the aborting is subject to a second time period and the method proceeds to the waiting after the second time period elapses.

9. A method of performing a failover operation between a first distributed database cluster and a second distributed database cluster, the method comprising:

blocking a plurality of software processes from making any new access requests to the first distributed database cluster;

completing a current access request to the first distributed database cluster that was initiated by one of the plurality of software processes before the failover operation was initiated;

waiting for data to replicate from the first distributed database cluster to the second distributed database cluster, wherein replicating includes any changes to the data from the current access request;

allowing the plurality of software processes to make the new access requests to the second distributed database cluster once the replicating has completed; and selecting a leader software process from the plurality of software processes, wherein the leader software process edits a failover state file that coordinates the failover operation among the plurality of software processes.

10. The method of claim 9, wherein the failover state file comprises the following variables:

a failover sequence number that uniquely identifies the failover operation;

a current state of the failover operation;

a time elapsed since the beginning of the current state of the failover operation;

an address of the first distributed database cluster; and an address of the second distributed database cluster.

11. The method of claim 9, wherein the failover state file is stored on a lock server.

12. The method of claim 9, wherein the plurality of software processes reads the failover state file during the failover operation to ensure that each software process is in the same portion of the failover operation as the other software processes.

13. The method of claim 12, wherein if a software process is not participating in the same portion of the failover operation as the other software processes, the software process will abort.

14. The method of claim 9, wherein the leader software process is chosen from the plurality of software processes through an election scheme.

15. The method of claim 14, wherein if the leader software process experiences a failure during the failover operation, the plurality software processes selects a replacement leader software process from among the plurality of software processes through an election scheme.

16. A non-transitory computer readable medium storing computer executable instructions, which, when executed by a processor, cause the processor to carry out a method for controlling a plurality of software processes through a failover operation between a first distributed database cluster and a second distributed database cluster, wherein the instructions comprise:

instructions to block a plurality of software processes from making any new access requests to the first distributed database cluster;

instructions to complete a current access request to the first distributed database cluster that was initiated by one of the plurality of software processes before the failover operation was initiated;

instructions to wait for data to replicate from the first distributed database cluster to the second distributed database cluster, wherein replicating includes any changes to the data from the current access request; and instructions to allow the plurality of software processes to make the new access requests to the second distributed database cluster once the replicating has completed;

wherein the plurality of software processes each have a database abstraction layer, and wherein the database abstraction layer comprises the computer executable instructions.

17. The non-transitory computer readable medium of claim 16, wherein the instructions to complete is subject to a first time period and the instructions to complete further comprises instructions to abort the current access request if it does not complete within the first time period.

18. The non-transitory computer readable medium of claim 16, wherein the instructions to wait are subject to a third time period and if the replicating does not complete within the third time period, a system administrator is notified that the failover operation has not completed.

19. A non-transitory computer readable medium storing computer executable instructions, which, when executed by a processor, cause the processor to carry out a method for controlling a plurality of software processes through a failover operation between a first distributed database cluster and a second distributed database cluster, wherein the instructions comprise:

instructions to block a plurality of software processes from making any new access requests to the first distributed database cluster;

instructions to complete a current access request to the first distributed database cluster that was initiated by one of the plurality of software processes before the failover operation was initiated, the instructions to complete subject to a first time period;

instructions to abort the current access request if it does not complete within the first time period;

instructions to wait for data to replicate from the first distributed database cluster to the second distributed database cluster, wherein replicating includes any changes to the data from the current access request; and instructions to allow the plurality of software processes to make the new access requests to the second distributed database cluster once the replicating has completed;

wherein the instructions to abort are subject to a second time period, and at the expiration of the second time period the instructions proceed to the instructions to wait.

20. A replicated distributed database system, the system comprising:

a plurality of distributed database clusters;

a plurality of computing devices running a plurality of software processes, wherein each software process in the plurality of software processes has a database abstraction layer that is configured to instruct the software process to:

block any new access requests to a first distributed database cluster within the plurality of distributed database clusters when a failover operation occurs;

complete a current access request to the first distributed database cluster that was initiated by the software process before the failover operation occurs; and allow the new access requests to be directed to a second distributed database cluster within the plurality of distributed database clusters after the failover operation is complete; and a plurality of lock servers configured to:

store a failover state file; and execute an election scheme to select a leader software process from the plurality of software processes; and monitor the replication of data from the first distributed database cluster to the second distributed database cluster.

21. The system of claim 20, wherein the leader software processes edit the failover state file.

22. The system of claim 20, wherein the plurality of distributed databases is arranged in a multi-master scheme.

23. The system of claim 20, wherein the failover state file comprises the following variables:
- a failover sequence number that uniquely identifies the failover operation;
- a current state of the failover operation;
- a time elapsed since the beginning of the current state of the failover operation;
- an address of the first distributed database cluster; and an address of the second distributed database cluster.

24. The system of claim 20, wherein the plurality of software processes reads the failover state file during the failover operation to ensure that each software process is in the same portion of the failover operation as the other software processes.

25. The system of claim 24, wherein if a software process is not participating in the same portion of the failover operation as the other software processes, the software process will abort.

26. The system of claim 20, wherein the new access requests and the current access request comprises requests to write data to the first distributed database cluster.

27. The system of claim 20, wherein each software process in the plurality of software processes generates a plurality of failover variables.

28. The system of claim 20, wherein if the leader software process experiences a failure during the failover operation, the plurality of software processes selects a replacement leader software process from among the plurality of software processes through the election scheme.

* * * * *